United States Patent
Li et al.

(10) Patent No.: US 10,936,669 B2
(45) Date of Patent: Mar. 2, 2021

(54) OBJECT CLUSTERING METHOD AND SYSTEM

(71) Applicant: Tencent Technology (Shenzhen) Company Limited, Shenzhen (CN)

(72) Inventors: Lin Li, Shenzhen (CN); Pei Xuan Chen, Shenzhen (CN); Qian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 124 days.

(21) Appl. No.: 16/428,958

(22) Filed: May 31, 2019

(65) Prior Publication Data
US 2019/0286657 A1    Sep. 19, 2019

Related U.S. Application Data

(63) Continuation of application No. PCT/CN2018/074552, filed on Jan. 30, 2018.

(30) Foreign Application Priority Data

Feb. 14, 2017  (CN) .......................... 201710078997.6

(51) Int. Cl.
  *G06F 16/906*  (2019.01)
  *G06F 16/93*  (2019.01)
  (Continued)

(52) U.S. Cl.
  CPC ............ *G06F 16/906* (2019.01); *G06F 16/00* (2019.01); *G06F 16/9035* (2019.01);
  (Continued)

(58) Field of Classification Search
  CPC .. G06F 16/906; G06F 16/93; G06F 16/90328; G06F 16/9035; G06F 16/00; G06K 9/6224; G06K 9/62
  (Continued)

(56) References Cited

U.S. PATENT DOCUMENTS 9,836,522 B2 * 12/2017 Nemery ................ G06F 16/285
10,026,402 B2 * 7/2018 Strope ..................... G06Q 30/02
(Continued)

FOREIGN PATENT DOCUMENTS

| CN | 102063458 A | 5/2011 |
|---|---|---|
| CN | 103136303 A | 6/2013 |
| CN | 103020163 A | 4/2018 |

OTHER PUBLICATIONS

Macropol, Kathy, et al., "Scalable Discovery of Best Clusters on Large Graphs", Proc. of the VLDB Endowment, vol. 3, No. 1, © 2010 VLDB Endowment, pp. 693-702.*
(Continued)

*Primary Examiner* — Robert Stevens
(74) *Attorney, Agent, or Firm* — Brinks Gilson & Lione

(57) ABSTRACT

System and methods for object clustering are provided. The system may determine a weight of a directed edge between nodes of a directed network graph. The weight may represent a similarity degree of target objects associated with the target nodes. The similarity degree may reflect strength of an association between the two target objects, and further reflect a possibility that the two target objects belong to the same clustering category. After the directed network graph is constructed, nodes in the directed network graph may be clustered based on weights of directed edges between the nodes in the directed network graph.

20 Claims, 6 Drawing Sheets

(51) Int. Cl.
  *G06F 16/9032* (2019.01)
  *G06F 16/9035* (2019.01)
  *G06K 9/62* (2006.01)
  *G06F 16/00* (2019.01)
(52) U.S. Cl.
  CPC ........ *G06F 16/90328* (2019.01); *G06F 16/93* (2019.01); *G06K 9/62* (2013.01); *G06K 9/6224* (2013.01)
(58) Field of Classification Search
  USPC .......................................................... 707/740
  See application file for complete search history.

(56) References Cited

U.S. PATENT DOCUMENTS

| | | | |
|---|---|---|---|
| 10,078,802 B2* | 9/2018 | Zhao | G06Q 50/01 |
| 2010/0223591 A1* | 9/2010 | Shi | G06F 9/5038 |
| | | | 717/102 |
| 2012/0284270 A1 | 11/2012 | Lee et al. | |
| 2014/0089324 A1 | 3/2014 | Ellsworth et al. | |
| 2014/0214936 A1* | 7/2014 | Abraham | H04W 4/21 |
| | | | 709/204 |
| 2017/0329844 A1* | 11/2017 | Tacchi | G06N 5/022 |
| 2018/0103111 A1* | 4/2018 | Narayanam | H04L 67/22 |

OTHER PUBLICATIONS

Satuluri, Venu, et al., "Symmetrizations for Clustering Directed Graphs", EDBT 2011, Uppsala, Sweden, Mar. 22-24, 2011, pp. 343-354.*

Sansen, Joris, et al., "Adjasankey: Visualization of huge hierarchical weighted and directed graphs", iV 2015, Barcelona, Spain, Jul. 22-24, 2015, pp. 211-216.*

* cited by examiner

OBJECT CLUSTERING METHOD AND SYSTEM

CROSS REFERENCE TO RELATED APPLICATION

This application is a continuation of International Application PCT/CN2018/074552, filed Jan. 30, 2018, entitled OBJECT CLUSTERING METHOD AND APPARATUS, which claims priority to Chinese Patent Application No. 201710078997.6, filed on Feb. 14, 2017, both of which are incorporated herein by reference in their entirety.

TECHNICAL FIELD

This disclosure relates to the field of big data and network information management, and in particular, to object clustering.

BACKGROUND

With development of Internet technology, large quantities of information may be frequently stored, accessed, replicated, etc. Clustering information may improve performance in terms of read/write times, search times, and other measure of computer performance. In many cases, the same type of objects included in the network information may be clustered. For example, one network user (i.e. a mobile subscriber) may use a plurality of different user equipment (mobile phones) to access a network. Present approaches to data clustering suffer from a variety of drawbacks and limitations resulting in low clustering precision.

SUMMARY

This present disclosure provides system and methods to improve clustering precision. By way of introductory example, a system may obtain a plurality of association objects respectively associated with target objects. The system may select, at random, at least two of the target objects. The system may determine, for the selected target objects, a weight indicative of a similarity degree between a first association object corresponding to a first one of the selected target objects and a second association object corresponding to a second one of the selected target objects. The system may construct a directed network graph, the directed network graph comprising nodes and a directed edge associating the nodes, at least two of the nodes corresponding to the selected target objects, the directed edge being weighted based on the weight. The system may assign category identifiers the nodes of the directed network graph, wherein each node is initially assigned a unique categorical identifier. The system may repeatedly reassign the categorical identifiers of the nodes.

To repeatedly reassign the categorical identifiers of the nodes, the system may select a target node from the nodes of the directed network graph. The system may identify in-degree nodes of the directed network graph, the in-degree nodes associated with corresponding directed edges, the corresponding directed edges pointed toward the target node. The system may group the in-degree nodes into in-degree node groups based on matching category identifiers. The system may determine, from the plurality of in-degree node groups, a target in-degree node group that has a largest total weight of the corresponding directed edges pointing to the target node. The system may assign a category identifier of the target in-degree node group to the category identifier of the target node.

The system may cluster target objects based on the categorical identifiers of the nodes of the directed network graph to generate a plurality of groups of clustered targeted objects. The system may generate a plurality of clustering categories corresponding each of the clustered groups of target objects.

Additional or alternative features, technical advantages, and examples are provided in the system and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
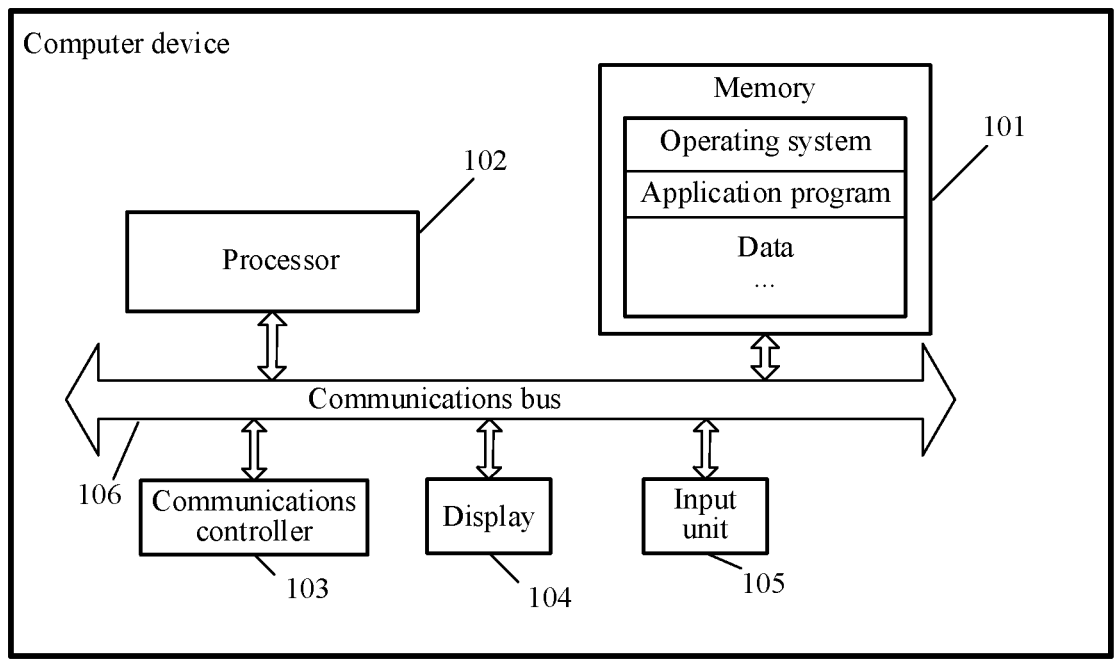
FIG. 1 is a schematic diagram of a possible composition architecture of a computer device to which an object clustering method is applicable according to an embodiment of this application.

With development of Internet technology, there are more information in networks. To effectively use network information, in many cases, the same type of objects included in the network information need to be clustered. For example, one network user may use a plurality of different user equipments to access a network. For example, the user may use a mobile phone of the user or a family or another terminal device to log in to an instant messaging system, a forum, or the like. To prevent malicious access or to provide a targeted service to a user, user equipments frequently used by one user need to be determined, so as to cluster the user equipments.

However, when a type of target objects in the network are clustered, only target objects associated with identifiers of same association objects are clustered together according to identifiers of association objects associated with the target objects. For example, if a plurality of user equipment uses the same user account when accessing a network system, it is considered that the plurality of user equipments are frequently used by the same user, and the plurality of user equipments is clustered together. Target objects are clustered according to identifiers of association objects associated with the target objects. Consequently, there is a relatively large quantity of clustering categories of the target objects, and target objects having relatively strong associations cannot be clustered together, resulting in low clustering precision.

Embodiments of this application provide an object clustering method and system. The object clustering method and system are applicable to clustering a plurality of user equipments logging in to a social network, or discovering topics of a plurality of articles.

An applicant finds out through research that in a conventional object clustering method, target objects are clustered only depending on whether identifiers of association objects associated with the target objects are the same. In some cases, clustering results may be incorrect. For example, if association objects are different, target objects associated with different association objects may actually belong to the different categories; or if association objects are the same, target objects associated with the same association objects may actually belong to different categories.

If association objects are different, but target objects associated with the different association objects may actually belong to the same clustering category, the target objects associated with the different association objects are considered as different clustering category if the target objects are clustered by using the conventional method. Consequently, an incorrect target object clustering result is obtained.

For example, the association objects are user accounts, and the target objects are mobile phones, a user A uses an identity of a user account U1 to log in to an instant messaging system by using a mobile phone M1; or the user A may uses an identity of a user account U2 to log in to an instant messaging system by using a mobile phone M2. In this case, if whether the mobile phone M1 and the mobile phone M2 are frequently used by the same user needs to be determined, the mobile phones needs to be clustered. If the conventional clustering method is used, because different user accounts are used when the mobile phone M1 and the mobile phone M2 are used, in other words, association objects are different, it is determined that the mobile phone M1 and the mobile phone M2 are not frequently used by the same user and that the mobile phone M1 and the mobile phone M2 do not belong to the same clustering category. Consequently, an incorrect clustering result is obtained.

However, by using the method provided in the embodiments of this application, strength of associations between target objects may be determined by determining a weight of a directed edge between target nodes of two random target objects in a directed network graph. The mobile phone M1 and the mobile phone M2 are used by the same user for login by using different user accounts. Therefore, there may be many association objects (user accounts) associated with both the mobile phone M1 and the mobile phone M2. In this way, it may be determined that an association between the mobile phone M1 and the mobile phone M2 is relatively strong, thereby determining that the mobile phone M1 and the mobile phone M2 are frequently used by the same user and that the mobile phone M1 and the mobile phone M2 can be clustered together.

If association objects are the same, but target objects associated with the same association objects may actually belong to different clustering categories, the target objects associated with the same association objects are clustered together if the target objects are clustered by using the conventional method. Consequently, an incorrect target object clustering result is obtained.

For example, the association objects are user accounts, and the target objects are mobile phones, a user A uses an identity of a user account U1 to log in to an instant messaging system by using a mobile phone M1; and because a user B knows the user account U1 of the user A, the user B also uses the identity of the user account U1 to log in to the instant messaging system by using a mobile phone M2. In this case, if whether the mobile phone M1 and the mobile phone M2 are frequently used by the same user needs to be determined, the mobile phones needs to be clustered. If a clustering method in the existing technology is used, because the user account U1 is used when both the mobile phone M1 and the mobile phone M2 are used, in other words, identifiers of the association objects are the same, it is determined that the mobile phone M1 and the mobile phone M2 are frequently used by the same user. Consequently, an incorrect clustering result is obtained.

However, by using the method provided in the embodiments of this application, strength of associations between target objects may be determined by determining a weight of a directed edge between target nodes of two random target objects in a directed network graph. The mobile phone M1 and the mobile phone M2 are used by different users for login by using the same user account U1. Therefore, there may be a few association objects (user accounts) associated with both the mobile phone M1 and the mobile phone M2, or there may be only the user account U1 associated with both the mobile phone M1 and the mobile phone M2. In this way, it may be determined that an association between the mobile phone M1 and the mobile phone M2 is relatively weak, thereby determining that the mobile phone M1 and the mobile phone M2 are not frequently used by the same user and that the mobile phone M1 and the mobile phone M2 cannot be clustered together.

As can be learned from the foregoing cases, the method provided in the embodiments of this application is advantageous for mining a similarity degree between target objects from a global perspective, and target objects having relatively strong associations are clustered together, thereby avoiding incorrect clustering, and further effectively improving the precision of target object clustering.

The method and the system in the embodiments are applicable to a single computer device or a distributed computing system.

FIG. 1 is a schematic diagram of a composition structure of a computer device to which an object clustering method and system are applicable according to an embodiment of this application. In FIG. 1, the computer device may include components such as a memory 101, a processor 102, a communications controller 103, a display 104, an input unit 105, and a communications bus 106. The processor 101, the memory 102, the communications interface 103, the display 104, and the input unit 105 communicate with each other through the communications bus 106.

The memory 101 may be configured to store a software program and controller. The memory 120 may store an operating system, an application program required by at least one function (for example, an image display function), and the like; and may further store data created according to use of a terminal and the like. The memory 101 may include a high-speed random access memory, and may further include a non-volatile memory such as at least one magnetic disk storage device or a flash memory device, or another volatile solid storage device.

The processor 102 is the control center of the terminal, and is connected to various parts of the terminal by using various interfaces and lines. By running or executing the software program and/or controller stored in the memory 101, and invoking data stored in the memory 101, the processor 102 performs various functions and data processing of the terminal, thereby performing overall monitoring on the terminal. Optionally, the processor 102 may include one or more processing units.

Examples of the processor 102 may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of units, subunits, and/or logic described herein. The computer code may include instructions executable with the processor.

The memory 101 may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. In some examples, the memory may include a non-transitory computer-readable storage medium includes a floppy disk, a hard disk, a magneto-optical disk, an optical memory, a magnetic tape, a non-volatile storage card, and a ROM. Optionally, program code may be downloaded form a server computer through a communications network.

The communications controller 103 may be configured to send or receive information, or send or receive a signal in a data processing process; or communicate with another device through a network, and so on.

The display 104 may be used on a window interface, and display processed data, patterns, directed network graphs, or the like on the window interface; and may further display information entered by a user, information provided to a user, and various graphical user interfaces of the computer device. These graphical user interfaces may include any combination of patterns, text, and images. The display may include a display panel, for example, a display panel configured in a form such as a liquid crystal display or an organic light-emitting diode. Further, the display may include a touch display panel capable of acquiring a touch event.

The input unit 105 may be configured to: receive information, such as a character or digits, entered by a user, and generate a signal input related to a user setting and function control. The input unit may include but is not limited to one or more of a physical keyboard, a mouse, a joystick, and the like.

It may be understood that regardless of a scenario, the terminal may be any device that can be used as an access service platform. For example, the terminal may be a mobile phone, a tablet computer, a desktop computer, or the like.

Figure 2:
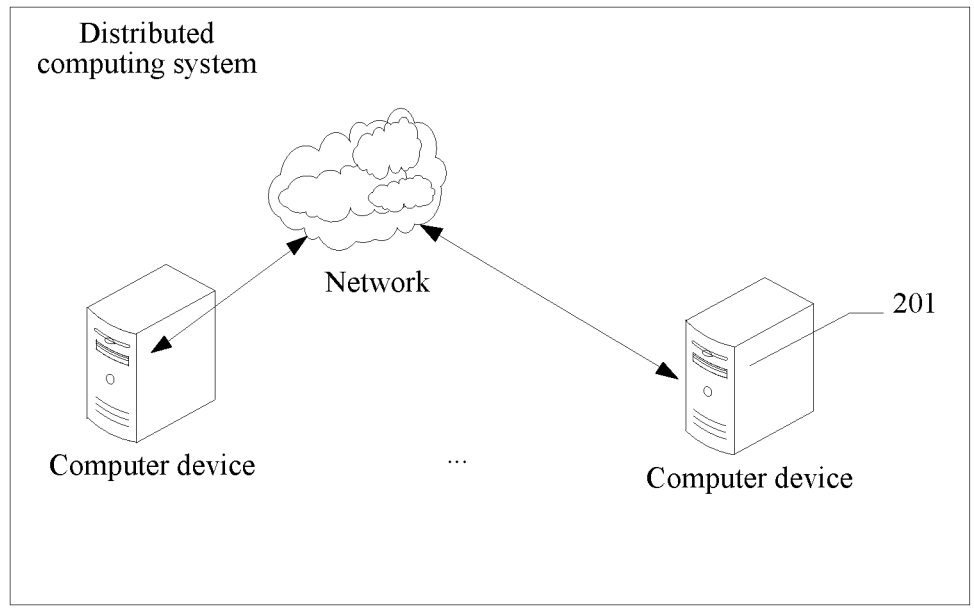
FIG. 2 is a schematic diagram of a system composition architecture suitable for an object clustering method according to an embodiment of this application.

Certainly, to improve a data processing capability, the object clustering method in the embodiments of this application can also be applied to a distributed computing system. FIG. 2 is a schematic diagram of a composition structure of a distributed computing system to which the object clustering method is applicable according to this application.

As can be learned from FIG. 2, the distributed computing system may include a plurality of computer devices 201. The plurality of computer devices 201 may be connected to each other through a network. The plurality of computer devices 201 can cooperate with each other to complete data processing in the object clustering method and system in the embodiments of this application.

Based on the foregoing generality, in the object clustering method in this application, after at least one association object respectively associated with a plurality of to-be-clustered target objects is obtained, a weight of a directed edge between nodes representing the two random target objects is determined in a directed network graph based on two random target objects and according to a similarity degree between an association object in a association object set of one target object and an association object in an association object set of the other target object; and the directed network graph and a plurality of nodes representing the plurality of association objects are constructed, where there are directed edges between nodes in the directed network graph; in addition, a unique category identifier is assigned to each node in the directed network graph; then each node is sequentially used as a target node that currently needs to be processed; a target in-degree node group that corresponds to a largest total weight of directed edges pointing to the target node is determined in at least one in-degree node group corresponding to the target node; a category identifier of the target node is updated to a target identifier of the target in-degree node group, until category identifiers of all nodes in the directed network graph no longer change, where the in-degree node group includes at least one in-degree node that points to the target node and that has the same category identifier; and target objects represented by nodes having the same category identifier are determined as belonging to one clustering category, to obtain a plurality of clustering categories corresponding to the plurality of target objects, thereby constructing the directed network graph according to the association objects associated with the target objects, and precisely clustering the target objects based on the directed network graph.

Based on FIG. 1 and FIG. 2, the following describes the object clustering method in the embodiments of this application in a similar way with reference to different embodiments.

Figure 3:
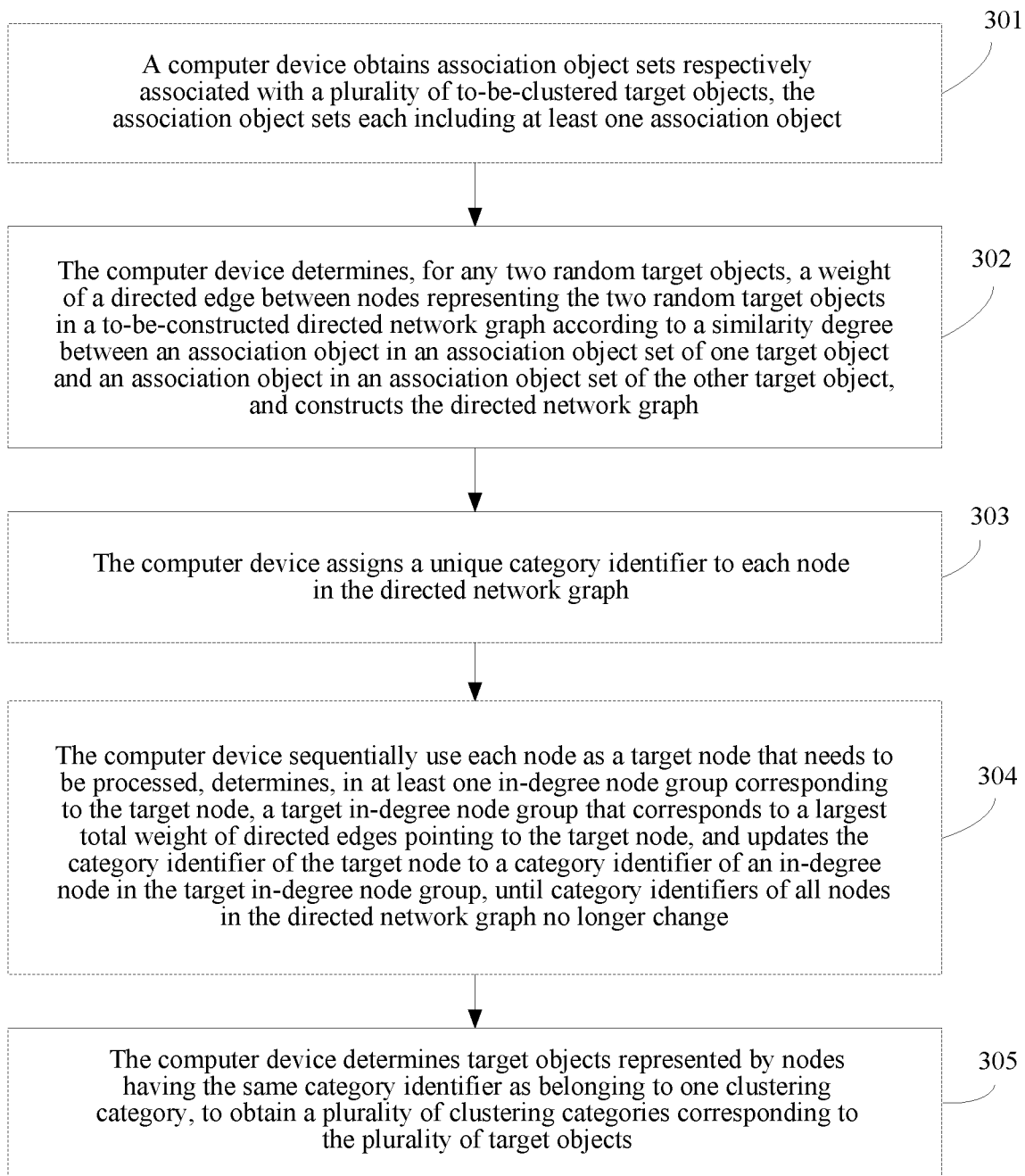
FIG. 3 is a schematic flowchart of an embodiment of an object clustering method according to this application.

FIG. 3 is a schematic flowchart of an embodiment of an object clustering method according to this application. The method in the embodiment may be applied to the foregoing computer device or computer system. The method in this embodiment may include the following steps:

S301. A computer device obtains association object sets respectively associated with a plurality of to-be-clustered target objects, the association object sets each including at least one association object.

The to-be-clustered target objects may be selected as required. Correspondingly, association objects that are associated with different target objects and that need to be obtained to cluster the different target objects are also different. For example, when clustering is required to cluster user equipments frequently used by the same user together, the target objects may be the user equipments, and the association objects associated with the target objects may be user identifiers such as user accounts or user name.

To-be-clustered target objects may refer to target objects that are unclustered. In some examples, a to-be-clustered target object may be flagged as unclustered. A flag may include information associated with a target object that establishes its clustered (or unclustered) status. Target objects, nodes, and/other data may be flagged as clustered or unclustered.

It may be understood that to determine the association object sets associated with the target objects, the computer device may obtain information about all association objects associated with the target objects, or may obtain a plurality of data relationships, where each data relationship include a correspondence between an identifier of one target object and an association object associated with the target object, and may determine association objects associated with each target object according to identifiers of the target objects.

S302. The computer device determines, for any two random target objects, a weight of a directed edge between nodes representing the two random target objects in a to-be-constructed directed network graph according to a similarity degree between an association object in an association object set of one target object and an association object in an association object set of the other target object, and constructs the directed network graph.

A similarity degree between association objects may reflect strength of an association between the two target objects, and further reflect a possibility that the two target objects belong to the same clustering category. Therefore, a weight, determined according to the similarity degree, of a directed edge between nodes of two random target objects in the directed network graph may reflect a possibility that the two target objects belong to the same clustering category. A larger weight indicates a higher possibility that the two target objects belong to the same clustering category. This facilitates subsequently clustering the target objects according to the directed network graph.

It may be understood that for ease of describing a similarity degree between two random target objects, for two random different target objects, the computer device may refer one target object as a first target object and refer a second target object as a second target object. The first target object is different from the second target object. It should be noted that, in this embodiment of this application, when target objects have different identifiers, it may be considered that two target objects having different identifiers are different target objects. In this case, an implementation for S302 may be: The computer device determines, in the to-be-constructed directed network graph according to a total quantity of association objects associated with both the first target object and the second target object and a first quantity of association objects associated with the first target object, a first similarity degree indicating that the second target object points to the first target object; and determines, in the to-be-constructed directed network graph according to the total quantity and a second quantity of association objects associated with the second target object, a second similarity degree indicating that the second target object points to the first target object. There may be a plurality of manners for determining a similarity degree between two target objects according to a total quantity of same association objects associated with the two target objects and a quantity of association objects associated with each target objects. This is not limited herein.

Correspondingly, the constructing the directed network graph by the computer device may be constructing a directed network graph including a first node used to represent the first target object and a second node used to represent the second target object, setting, to the first similarity degree, a weight of a directed edge pointing from the second node to the first node in the directed network graph, and setting, to the second similarity degree, a weight of a directed edge pointing from the first node to the second node.

It may be understood that the directed network graph includes nodes and the directed edges between the nodes. In this embodiment of this application, the directed network graph constructed by the computer device includes a plurality of nodes respectively representing the plurality of target objects. However, for ease of description, this application uses two random target objects as an example for description. Correspondingly, for a random first node and second node in the directed network graph, a similarity degree indicating that the first target object represented by the first node points to the second target object represented by the second node is used as the weight of the directed edge pointing from the first node to the second node; and a similarity degree indicating that the second target object points to the first target object is used as the weight of the directed edge pointing from the second node to the first node.

It may be understood that, if a similarity degree indicating that one target object points to another target object is 0, it indicates that the two target objects do not have a same association object. In this case, nodes representing the two target objects in the directed network graph may not have connected directed edges.

It should be noted that the foregoing implementation for step S302 in this embodiment of this application is only one implementation for determining, in the directed network graph based on a similarity degree between association objects associated with two random target objects, a weight of a directed edge between two nodes representing the two target objects. However, it may be understood that there may be a plurality of manners for embodying a similarity degree between association objects associated with target objects. Correspondingly, there also may be a plurality of manners for determining, based on the similarity degree between the association objects associated with the target objects, a weight of a directed edge between nodes representing the target objects. This is not limited herein.

S303. The computer device assigns a unique category identifier to each node in the directed network graph.

The category identifier is used to represent a clustering category to which a node belongs. Because before clustering is performed based on the directed network graph, that target objects represented by which nodes can be clustered together is unclear, the computer device may consider that each node belongs to one clustering category, and therefore, assign a unique category identifier to each node. In a subsequent process of performing clustering based on the directed network graph, category identifiers of some or all nodes constantly change, and the clustering is completed until the category identifiers of all the nodes no longer change.

S304. The computer device sequentially uses each node in the directed network graph as a target node that needs to be processed, and updates the category identifier of the target node to a category identifier of an in-degree node in a target in-degree node group that corresponds to a largest total weight of in-degree edges in at least one in-degree node group corresponding to the target node, until category identifiers of all nodes in the directed network graph no longer change.

For any node in the directed network graph, another nodes in the directed network graph pointing to the node is referred as an in-degree node of the node, and an in-degree node of a node can also be understood as a neighbor node of the node in the directed network graph. Any node in the directed network graph has at least one in-degree node.

For ease of description, in this embodiment of this application, a directed edge pointing from the in-degree node to the node may be referred to as an in-degree edge. As can be learned, one in-degree node corresponds to one in-degree edge.

The in-degree node group includes at least one in-degree node that has a directed edge pointing to the target node and that has the same category identifier. A total weight of in-degree edges of the in-degree node group is a sum of weights of in-degree edges corresponding to all in-degree nodes in the in-degree node group.

It may be understood that because a weight of an in-degree edge represent a similarity degree between an in-degree node corresponding to the in-degree edge and a to-be-updated node, a larger weight of the in-degree edge indicates a higher possibility that target objects represented by in-degree nodes corresponding to the in-degree edge and a target objects corresponding to the target node belong to the same category. Correspondingly, if a sum of weights of all in-degree edges in one in-degree node group is the largest, a possibility that the target node and all the in-degree nodes in the in-degree node group belong to the same category is the highest. In this way, the category identifier of the target node and a category identifier of the target in-degree node group having the largest sum of weights of in-degree edges can be unified. In this embodiment, the category identifiers are unified into the category identifier of the target in-degree node group. That is, the target in-degree node group that corresponds to the largest total weight of directed edges needs to be determined in the plurality of in-degree node groups corresponding to the target node, and the category identifier of the target node is updated to the category identifier of the target in-degree node group.

It should be noted that step S304 is a process of continuous looping and iteration. Each time iteration is completed, the computer device needs to determine whether a node whose category identifier is changed in the iteration process exists; if the node whose category identifier is changed exists, the computer device still needs to reselect a node from the directed network graph as a target node, and performs iteration again.

It may be understood that after last iteration is completed, in the last iteration process, if a category identifier of a node does not change, it indicates that clustering between the category identifier and an in-degree node thereof has been completed, and the category identifier of the node will not change even if iteration is subsequently performed again. To avoid repeatedly clustering the nodes whose category identifiers have not changed, to reduce a data processing amount, optionally, the computer device may use all the nodes in the directed network graph as to-be-processed nodes only in first iteration. If there are to-be-processed nodes that have not been processed, the computer device selects, from the to-be-processed nodes that have not been processed, the target node that needs to be processed, and updates the category identifier of the target node to the category identifier of the target in-degree node group that corresponds to the largest total weight of in-degree edges in the at least one in-degree node group corresponding to the target node, until all the to-be-processed nodes are processed as target nodes. Moreover, after all the to-be-processed nodes are used as target nodes, if there is a node having different category identifiers before and after the update, the computer device may use only the node having different category identifiers before and after the update as a to-be-processed node, and return to perform the operation such as if there are to-be-processed nodes that have not been processed, selecting, from the to-be-processed node, the target node that needs to be processed. If there is no node having different category identifiers before and after the update, it indicates that the clustering ends, and the computer device may perform step S306.

S305. The computer device determines target objects represented by nodes having the same category identifier as belonging to one clustering category, to obtain a plurality of clustering categories corresponding to the plurality of target objects.

In this embodiment of this application, a weight of a directed edge between target nodes representing two random to-be-clustered target objects is determined in a to-be-constructed directed network graph according to a similarity degree of association objects associated with the two target objects, and the directed network graph is constructed. Because the weight of the directed edge between nodes of the two random target objects in the directed network graph is determined according to the similarity degree of the association objects associated with the two target objects, the similarity degree may reflect strength of an association between the two target objects, and further reflect a possibility that the two target objects belong to the same clustering category. Therefore, a weight of a directed edge between nodes of two random target objects in the directed network graph may reflect a possibility that the two target objects belong to the same clustering category. A larger weight indicates a higher possibility that the two target objects belong to the same clustering category. After the directed network graph is constructed, different nodes in the directed network graph may be clustered based on weights of directed edges between the nodes in the directed network graph, to obtain categories corresponding to the plurality of target objects. As can be learned, compared with a conventional method for clustering target objects only depending on whether identifiers of association objects associated with the target object s are the same, this embodiment of this application is advantageous for mining a similarity degree between target objects from a global perspective, and target objects having relatively strong associations are clustered together, thereby effectively improving the precision of target object clustering.

The following uses a scenario in which to-be-clustered target objects are user equipments and documents as an example, to describe the object clustering method in this embodiment of this application.

Figure 4:
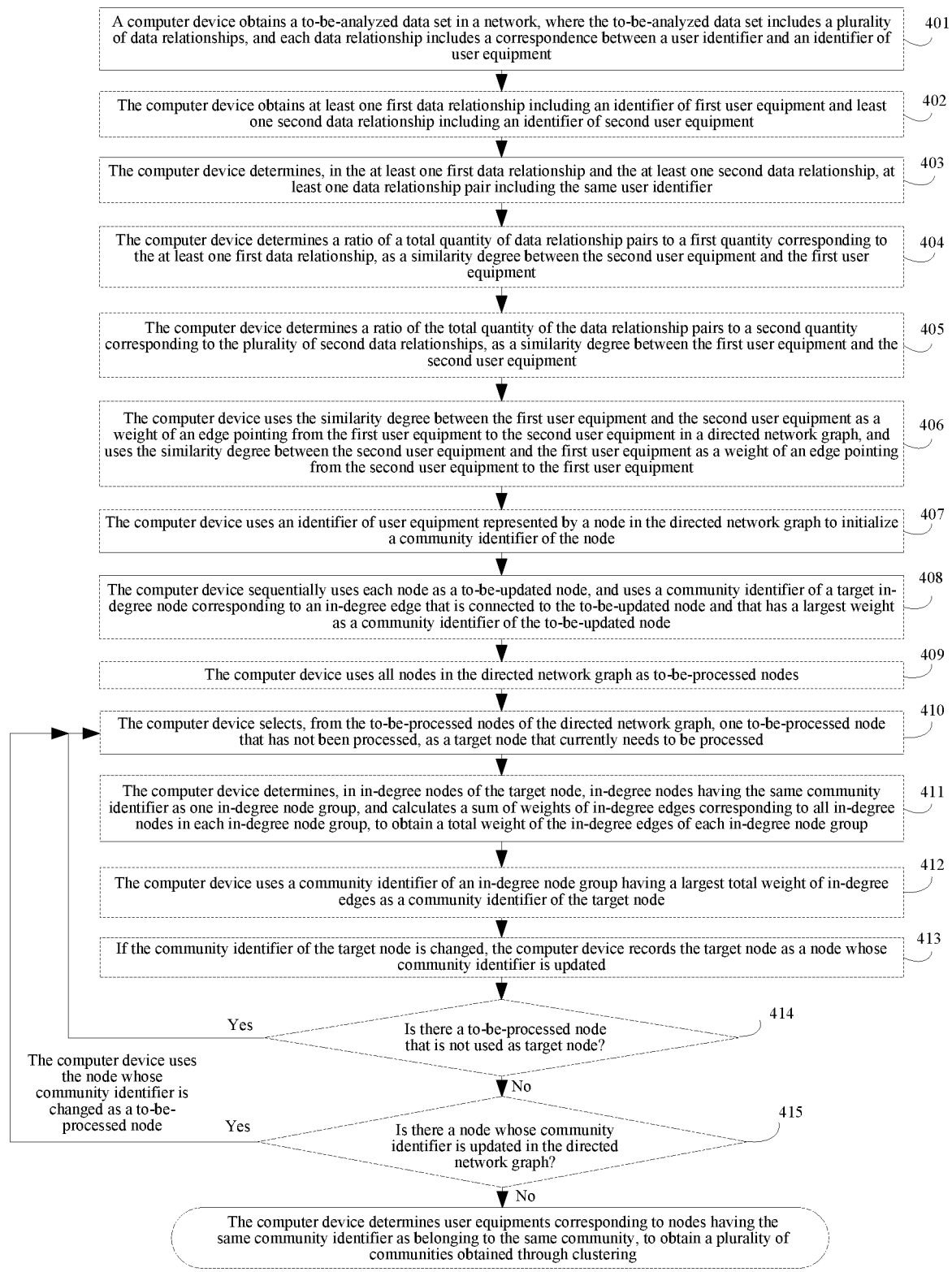
FIG. 4 is a schematic flowchart of another embodiment of an object clustering method according to this application.

First, clustering on user equipments is used as an example for description. With reference to FIG. 1 and FIG. 2, FIG. 4 is a schematic flowchart of an embodiment of an object clustering method. The method in this embodiment is applied to the computer device or the distributed computing system mentioned above. The method in this embodiment is described by using an example in which a plurality of user equipments logging in to a social network is clustered to cluster devices of the same user together. The user equipments in this embodiment of this application may be terminals such as mobile phones, tablet computers, and desktop computers.

As shown in FIG. 4, the method in this embodiment may include the following steps:

S401. A computer device obtains a to-be-analyzed data set in a network, where the to-be-analyzed data set includes a plurality of data relationships, and each data relationship includes a correspondence between a user identifier and an identifier of user equipment.

In each data relationship, a user identifier represents an identifier of a user accessing (or logging in to) a preset network system; an identifier of user equipment represents an identifier of user equipment used by the user to access the preset network system. For example, the data relationship may be expressed as (user U, user equipment Ue).

The user identifier may be a user name of the user in the preset network system, a network account of the user, a phone number of the user, or the like. An identifier of user equipment uniquely identifies one user equipment. For example, the identifier of the user equipment may be an IP address or device identification code of the user equipment.

It may be understood that, because the computer device may analyze one or more preset network systems in a cluster analysis process, there may be one or more preset network systems. The preset network systems may be a plurality of social networks, for example, a plurality of different instant messaging systems or forum systems.

It should be noted that, although there may be a plurality of preset network systems, because a data relationship is a correspondence between a user identifier and an identifier of user equipment, if the data relationship is determined, the preset network system in the data relationship is a uniquely determined preset network system.

For example, if a user A uses an identity of an instant messaging user U1 to log in to an instant messaging system by using a mobile phone M1, a user name of the instant messaging user U1 and an identifier of the mobile phone M1 form a data relationship. For another example, if the user A uses an identity of an instant messaging user U2 to log in to the instant messaging system by using a mobile phone M2, a data relationship formed by a user name of the instant messaging user U2 and an identifier of the mobile phone M2 is obtained. In this case, the user identifiers are different, but the user equipments are actually used by the same user. This case corresponds to the foregoing case in which the association objects are different, but the target objects associated with the different association objects may actually belong to the same clustering category.

For another example, if a user A uses an identity of an instant messaging user U1 to log in to an instant messaging system by using a mobile phone M1, a user name of the instant messaging user U1 and an identifier of the mobile phone M1 form a data relationship; and if a user B uses the identity of the instant messaging user U1 to log in to the instant messaging system by using a mobile phone M2, a data relationship formed by a user name of the instant messaging user U1 and an identifier of the mobile phone M2 is obtained. In this case, the user identifiers are the same, but the user equipments are actually used by different users. This case corresponds to the foregoing case in which the association objects are the same, but the target objects associated with the same association objects may actually belong to different clustering categories.

It may be understood that an objective of this embodiment of this application is to determine user equipments frequently used by the same user, so as to cluster the user equipments used by the same user together. Therefore, the to-be-analyzed data set does not include the same data relationships.

S402. For first user equipment and second user equipment that are represented by identifiers of two random different user equipments, obtain at least one first data relationship including an identifier of the first user equipment and at least one second data relationship including an identifier of the second user equipment.

For example, it is assumed that that an identifier of the first user equipment is Ue1, and if the data relationship includes Ue1, the data relationship is the first data relationship including the identifier Ue1 of the first user equipment.

A quantity of the first data relationships may be different from that of the second data relationships.

It should be noted that in this embodiment of this application, one of two random user equipments is referred to as first user equipment, and the other user equipment is referred to as second user equipment merely for the purpose of description, where identifiers of user equipments of the first user equipment and the second user equipment are different.

S403. The computer device determines, in the at least one first data relationship and the at least one second data relationship, at least one data relationship pair including the same user identifier.

Each data relationship pair includes the first data relationship and the second data relationship that have the same user identifier.

It may be understood that one data relationship pair represents that the same user has used both the first user equipment and the second user equipment to log in to the preset network system.

For example, it is assumed that an identifier of the first user equipment is Ue1, an identifier of the second user equipment is Ue2, and if the first data relationship is (user A, Ue1), and the second data relationship is (user A, Ue2), it indicates that the first data relationship and the second data relationship are a data relationship pair having the same user identifier user A, and it also indicates that the user whose user identifier is user A has used the first user equipment Ue1 and the second user equipment Ue2 to log in to the preset network system.

S404. The computer device determines a ratio of a total quantity of data relationship pairs to a first quantity corresponding to the at least one first data relationship, as a similarity degree between the second user equipment and the first user equipment.

The total quantity of the data relationship pairs is a total quantity of users that have used the first user equipment and the second user equipment to log in to the preset network system.

For ease of distinction, in this embodiment of this application, a total quantity of the first data relationships is referred to as a first quantity, and a total quantity of the second data relationships is referred to as a second quantity. The first quantity represents a total quantity of users that have logged in to the preset network system by using or through the first user equipment. The second quantity represents a total quantity of users that have logged in to the preset network system by using or through the second user equipment.

Optionally, the similarity degree $W_{Ue2Ue1}$ between the second user equipment Ue2 and the first user equipment Ue1 may be expressed as follows:

$$W_{Ue2Ue1} = \frac{|N(Ue1) \cap N(Ue2)|}{|N(Ue1)|} \quad \text{(Formula 1)}$$

where $|N(Ue1) \cap N(Ue2)|$ represents the total quantity of users that have used both the first user equipment Ue1 and the second user equipment Ue2 to log in to the preset network system, that is, a total quantity of data relationship pairs; and $|N(Ue1)|$ represents the total quantity of users that have used the first user equipment Ue1 to log in to the preset network system, that is, the first quantity of the first data relationships.

S405. The computer device determines a ratio of the total quantity of the data relationship pairs to the second quantity corresponding to the plurality of second data relationships, as a similarity degree between the first user equipment and the second user equipment.

Optionally, the similarity degree $W_{Ue1Ue2}$ between the first user equipment Ue1 and the second user equipment Ue2 may be expressed as follows:

$$W_{Ue1Ue2} = \frac{|N(Ue1) \cap N(Ue2)|}{|N(Ue2)|} \quad \text{(Formula 2)}$$

where $|N(Ue1) \cap N(Ue2)|$ represents the total quantity of the data relationship pairs, and $|N(Ue2)|$ represents a total quantity of users that have used the second user equipment Ue2 to log in to the preset network system, that is, the second quantity of the second data relationship.

It should be noted that if the total quantity of users that have used both the first user equipment and the second user equipment to log in to the preset network system, that is, the total quantity of the data relationship pairs; the quantity of users that have used the first user equipment to log in to the preset network system, that is, the first quantity of the first data relationships; and the quantity of users that have used the second user equipment to log in to the preset network system, that is, the second quantity of the second data relationships are determined, manners for which the computer device calculates the similarity degree between the second user equipment and the first user equipment and the similarity degree between the first user equipment and the second user equipment are not limited to those shown in step S303 and step S304. In actual application, there may be other manners for calculating a similarity degree between two devices. This is not limited herein.

It may be understood that in this embodiment of this application, step S401 and step S402 are only optional implementations for obtaining a user identifier corresponding to user equipment. In actual application, the computer device or the distributed computing system may alternatively directly obtain the user identifiers respectively corresponding to a plurality of to-be-clustered user equipments. That is, the computer device obtains a user identifier of each to-be-clustered user equipment, where each user equipment may correspond to one or more user identifiers, and the user identifier corresponding to the user equipment represents an identifier of a user that uses the user equipment to log in to the preset network system. For example, for two random to-be-clustered first user equipments and the second user equipment, the computer device may obtain the user identifiers of all users that use the first user equipment to log in to the social network, and obtain user identifiers of all users that use the second user equipment to log in to the social network.

Correspondingly, a first quantity of users that use the first user equipment to log in to the social network may be a quantity of user identifiers corresponding to the first user equipment. A second quantity of users that use the second user equipment to log in to the social network may be a quantity of user identifiers corresponding to the second user equipment.

In this embodiment, the similarity degree between the first user equipment and the second user equipment is equivalent to the first similarity degree mentioned in the foregoing embodiment, and the similarity degree between the second user equipment and the first user equipment is equivalent to the second similarity degree mentioned in the foregoing embodiment.

S406. The computer device uses the first user equipment and the second user equipment as nodes of the directed network graph, uses the similarity degree between the first user equipment and the second user equipment as a weight of an edge pointing from the first user equipment to the second user equipment in the directed network graph, and uses the similarity degree between the second user equipment and the first user equipment as a weight of an edge pointing from the second user equipment to the first user equipment.

It may be understood that an edge between two random nodes in the directed network graph has a direction and a weight, and edges having different directions between the two nodes may have different weights. For example, for two random nodes in the directed network graph: a node A and a node B, a weight of an edge pointing from the node A to the node B may be a weight 1, a weight of an edge pointing from the node B to the node A may be a weight 2, and the weight 1 may be different from the weight 2.

In this embodiment of this application, each user equipment may be used as a node in the directed network graph to construct the directed network graph. For two random user equipments, namely, the first user equipment and the second user equipment, in the directed network graph, a weight of an edge (which is also referred to as a directed edge) pointing from a node of the first user equipment to a node of the second user equipment represents the similarity degree between the first user equipment and the second user equipment; correspondingly, a weight of an edge (which is also referred to as a directed edge) pointing from the node of the second user equipment to the node of the first user equipment represents the similarity degree between the second user equipment and the first user equipment.

Figure 5A:
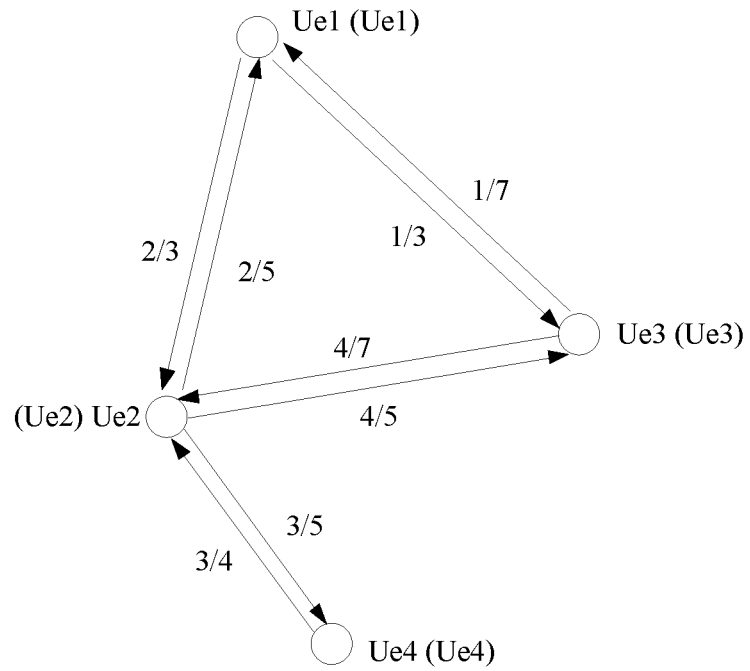
FIG. 5*a* is a schematic diagram of a part of composition structure of a constructed directed network graph according to an embodiment of this application.

For example, FIG. 5a is a schematic diagram of a part of a structure of a constructed directed network graph according to an embodiment of this application. Each node in FIG. 5a represents user equipment corresponding to a unique user equipment identifier, and a number marked above each edge in FIG. 5a is a weight corresponding to the edge. As can be learned from FIG. 5a, there are two directed edges pointing to different directions between a node Ue1 and node Ue2, where a weight of the directed edge pointing from Ue1 to Ue2 is ⅔, and a weight of the directed edge pointing from Ue2 to Ue1 is ⅖.

S407. The computer device uses an identifier of user equipment represented by a node in the directed network graph to initialize a community identifier of the node.

The community identifier is used to represent a community into which the user equipment represented by the node is clustered. One community may be considered as one clustering category.

As shown in FIG. 5a, in the directed network graph in FIG. 5a, each node corresponds to one community identifier, and the community identifier is an identifier of user equipment corresponding to the node. As shown in FIG. 5a, beside each node, there is a community identifier of the node, and the identifier in brackets represents the identifier of the user equipment corresponding to the node.

It may be understood that using an identifier of user equipment corresponding to a node as a community identifier corresponding to the node is merely one implementation. Because the computer device cannot determine user equipments that can be clustered to one community before the clustering, the computer device assigns a unique community identifier to each node. Therefore, step S407 may alternatively be assigning a unique community identifier in the directed network graph to each node.

S408. The computer device sequentially uses each node in the directed network graph as a to-be-updated node; determines, in a plurality of in-degree nodes connected to the to-be-updated node, a target in-degree node corresponding to an in-degree edge having a largest weight; and uses a community identifier of the target in-degree node as a community identifier of the to-be-updated node.

It may be understood that a larger weight of an in-degree edge indicates a greater possibility that user equipment corresponding to an in-degree node corresponding to the in-degree edge and user equipment corresponding to the to-be-updated node belong to user equipments frequently used by the same user. Therefore, the computer device may classify the to-be-updated node and the target in-degree node corresponding to the in-degree edge having the largest weight into one category, to be specific, the to-be-updated node and the target in-degree node belong to the same community.

Figure 5B:
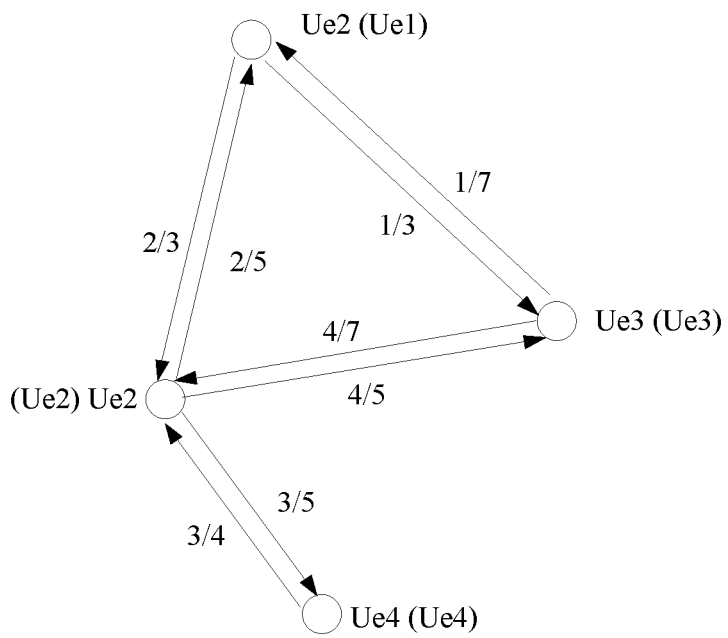
FIG. 5*b* is a schematic diagram of a directed network graph obtained after a community identifier of one node in the directed network graph shown in FIG. 5*a* is updated by using a community identifier of an in-degree node corresponding to an in-degree edge having a largest weight.

To identify nodes (or user equipments) belonging to the same community, community identifiers of the target in-degree node and the to-be-updated node need to be unified. For example, FIG. 5b is a schematic diagram obtained after a community identifier of a node is updated, based on the directed network graph shown in FIG. 5a, to a community identifier of a target in-degree node corresponding to an in-degree edge that has a largest weight and that corresponds to the node. For example, it can be learned by comparing nodes corresponding to user equipments Ue1 in FIG. 5a and FIG. 5b that a community identifier of the node corresponding to the user equipment Ue1 in FIG. 5a is Ue1. Because among in-degree nodes of the node, an in-degree edge pointing from a node (where a community identifier is also Ue2) representing user equipment Ue2 to the node representing the user equipment Ue1 has the largest weight, the community identifier of the node corresponding to the user equipment Ue1 is changed to Ue2. After the community identifier of the node corresponding to the user equipment Ue1 is updated, community identifiers of other nodes may be sequentially updated.

In this embodiment of this application, an example in which a community identifier of a to-be-updated node is updated to a community identifier of a target in-degree node corresponding to the to-be-updated node is used for description. However, it may be understood that updating the community identifier of the target in-degree node to the community identifier of the to-be-updated node is also applicable to this embodiment of this application.

S409. The computer device uses all nodes in the directed network graph as to-be-processed nodes.

In the first round of loop, the computer device may use all the nodes in the directed network graph as to-be-processed nodes, to sequentially update community identifiers of all the nodes in the directed network graph.

S410. The computer device selects, from the to-be-processed nodes of the directed network graph, one to-be-processed node that has not been processed, as a target node that needs to be processed.

In this embodiment of this application, operations of the following steps S411 to S412 are sequentially performed on each node in the directed network graph. For ease of distinction, a node that needs to be processed is referred to as a target node. Steps S411 and S412 are a loop that is repeatedly performed. If in this round of loop, a to-be-processed node in the directed network graph has already been used as a target node, the to-be-processed node does not need to be used as the target node repeatedly in this round of processing.

S411. The computer device determines, in in-degree nodes of the target node, in-degree nodes having the same community identifier as one in-degree node group, and calculates a sum of weights of in-degree edges corresponding to all in-degree nodes in each in-degree node group, to obtain a total weight of the in-degree edges of each in-degree node group.

It may be understood that after step S408, among in-degree nodes of one target node, there may be two or more in-degree nodes having the same community identifier. In this embodiment of this application, in-degree nodes having the same community identifier are classified into one in-degree node group. Certainly, if a community identifier of one in-degree node of the target node is different from community identifiers of other in-degree nodes, the in-degree node may be individually classified into one in-degree node group, and a total weight of in-degree edges corresponding to the in-degree node group is a weight of an in-degree edge pointing from the in-degree node to the target node. As can be learned, one in-degree node group includes at least one in-degree node.

To determine in-degree nodes in which in-degree node groups belong to nodes corresponding to user equipments frequently used by the same user as the target node does, the computer device needs to calculate sums of weights of in-degree edges of all in-degree nodes in the in-degree node groups. In this embodiment of this application, a sum of weights of in-degree edges corresponding to all in-degree nodes in an in-degree node group is referred to as a total weight of the in-degree edges. The total weight of the in-degree edges reflects similarity degrees between all the in-degree nodes in the in-degree node group and the target node.

S412. The computer device uses a community identifier of an in-degree node group having a largest total weight of in-degree edges as a community identifier of the target node.

It may be understood that in-degree nodes in the same in-degree node group actually belong to the same community (that is, are clustered into one clustering category); and if a total weight of in-degree edges of the in-degree node group is the largest, it indicates that a similarity degree between the target node and all the in-degree nodes in the in-degree node group is the highest. Therefore, the computer device may cluster the target node and the in-degree nodes in the in-degree node group into one community, and update the community identifier of the target node to a community identifier of the in-degree node group having the largest total weight of the in-degree edges.

S413. If the community identifier of the target node is changed, the computer device records the target node as a node whose community identifier is updated.

It may be understood that, if the community identifier of the in-degree node group having the largest total weight of the in-degree edges is different from the community identifier of the target node before the update, after the computer device uses the community identifier of the in-degree node group having the largest total weight of the in-degree edges as the community identifier of the target node, the community identifier of the target node is updated, and the target node needs to needs to be marked, so as to subsequently use the target node as a to-be-processed node that needs to be updated in the next round.

Optionally, when the target node is selected in step S410, the community identifier of the target node is used as the community identifier before the update, the updated community identifier of the target node in step S412 is used as the community identifier after the update, and further, whether the community identifier of the target node before the update is consistent with the community identifier after the update is determined through comparison. If the two community identifiers are inconsistent, it indicates that the community identifier of the target node is changed.

It should be noted that step S413 is an optional step. In actual application, whether a node whose community identifier is changed among the target nodes exists may alternatively be determined after all the to-be-processed nodes in this round are used as target nodes. In other words, whether a target node whose community identifier is updated exists may be directly determined in step S415.

S414. The computer device detects whether there is a to-be-processed node that has not been used as a target node in the directed network graph; and if yes, returns to step S410; or if no, performs step 415.

S415. The computer device determines whether a node whose community identifier is updated exists in the directed network graph; if yes, uses the node whose community identifier is updated as a to-be-processed node in the directed network graph, and returns to step S410; or if no, determines user equipments corresponding to nodes having the same community identifier as belonging to the same community, to obtain a plurality of communities obtained through clustering.

User equipments belonging to the same community may be considered as a set of user equipments frequently used by the same user.

It may be understood that if a community identifier of each node in the directed network graph is updated to a community identifier corresponding to an in-degree node group having a highest similarity degree with the node, after iteration from step S410 to step S414 is performed, the community identifier of each node the directed network graph no longer changes. Therefore, when no node whose community identifier is updated exists in the directed network graph, it indicates that clustering on all nodes in the directed network graph is completed. In this case, nodes having the same community identifier are clustered into one community.

It should be noted that, in this embodiment of this application, step S408 is an optional step. In step S408, it is only considered that a community identifier of each node in the newly constructed directed network graph is unique. For one node, two or more in-degree nodes having the same community identifier do not exist in in-degree nodes of the node. Therefore, for ease of understanding, a community identifier of a target in-degree node corresponding to an in-degree edge having a largest weight is directly used as a community identifier of a to-be-updated node. However, it may be understood that if the method does not have step S408, that the operations of steps S409 to S415 are directly performed is also feasible. In this case, in the first found of loop, because a community identifier of each node is unique, it may be considered that each in-degree node belongs to one in-degree node group. In this way, an in-degree node group having a largest total weight of in-degree edges is actually the target in-degree node corresponding to the in-degree edge having the largest weight.

The following uses an example in which topic discovery is performed on a plurality of documents including different community identifiers, to describe the object clustering method in the embodiments of this application.

Figure 6:
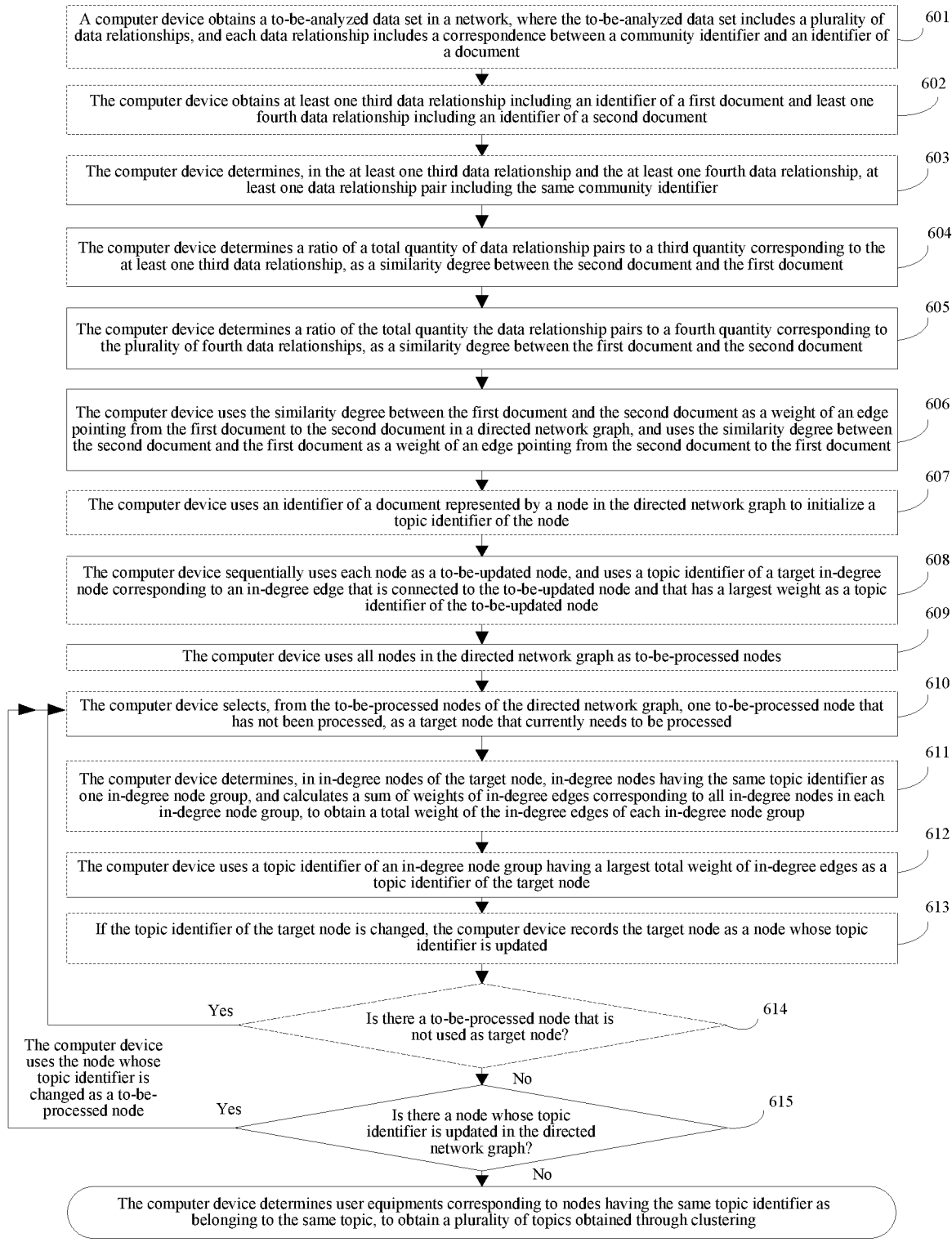
FIG. 6 is a schematic flowchart of another embodiment of an object clustering method according to this application.

With reference to FIG. 1 and FIG. 2, FIG. 6 is a schematic flowchart of another embodiment of an object clustering method. The method in this embodiment is applicable to the computer device or the distributed computing system mentioned above. The method in this embodiment may include the following steps:

S601. A computer device obtains a to-be-analyzed data set in a network, where the to-be-analyzed data set includes a plurality of data relationships, and each data relationship includes a correspondence between a community identifier and an identifier of a document.

In each data relationship, community identifiers represent identifiers of some preset network systems, for example, identifiers of social networks, or related identifiers of instant messaging systems; and an identifier of a document represents an identifier that is obtained from a network and that is used to uniquely represent the document.

It may be understood that an objective of this embodiment of this application is to determine documents frequently used in the same community network, to cluster the documents frequently used by the same community together, so as to extract a topic of the document.

S602. For a first document and a second document represented by identifiers of two random different documents, the computer device obtains at least one third data relationship including an identifier of the first document and at least one fourth data relationship including an identifier of the second document.

S603. The computer device determines, in the at least one third data relationship and the at least one fourth data relationship, at least one data relationship pair including the same community identifier.

Each data relationship pair includes the third data relationship and the fourth data relationship that have the same community identifier.

It may be understood that one data relationship pair represents that one community has used both the first document and the second document.

S604. The computer device determines a ratio of a total quantity of data relationship pairs to a third quantity corresponding to the at least one third data relationship, as a similarity degree between the second document and the first document.

The total quantity of data relationship pairs is a total quantity of communities that have used both the first document and the second document.

For ease of distinction, in this embodiment of this application, a total quantity of the third data relationships is referred to as a third quantity, and a total quantity of the fourth data relationships is referred to as a fourth quantity. The third quantity of represents a total quantity of communities that have used the first document; and the fourth quantity of represents a total quantity of communities that have used the second document.

S605. The computer device determines a ratio of the total quantity the data relationship pairs to the fourth quantity corresponding to the plurality of fourth data relationships, as a similarity degree between the first document and the second document.

For specific manners for calculating the similarity degree between the second document and the first document and the similarity degree between the first document and the second document, refer to related descriptions of the foregoing embodiments. Details are not described herein again.

S606. The computer device uses the first document and the second document as nodes in directed network graph, uses the similarity degree between the first document and the second document as a weight of an edge pointing from the first document to the second document in the directed network graph, and uses the similarity degree between the second document and the first document as a weight of an edge pointing from the second document to the first document.

S607. The computer device uses an identifier of a document represented by a node in the directed network graph to initialize a topic identifier of the node.

The topic identifier is used to represent a topic corresponding to the document represented the node. One topic may be considered as one clustering category.

S608. The computer device sequentially uses each node in the directed network graph as a to-be-updated node; determines, in a plurality of in-degree nodes connected to the to-be-updated node, a target in-degree node corresponding to an in-degree edge having a largest weight; and uses a topic identifier of the target in-degree node as a topic identifier of the to-be-updated node.

S609. The computer device uses all nodes in the directed network graph as to-be-processed nodes.

S610. The computer device selects, from the to-be-processed nodes of the directed network graph, one to-be-processed node that has not been processed, as a target node that needs to be processed.

S611. The computer device determines, in in-degree nodes of the target node, in-degree nodes having the same topic identifier as one in-degree node group, and calculates a sum of weights of in-degree edges corresponding to all in-degree nodes in each in-degree node group, to obtain a total weight of the in-degree edges of each in-degree node group.

S612. The computer device uses a topic identifier of an in-degree node group having a largest total weight of in-degree edges as a topic identifier of the target node.

S613. If the topic identifier of the target node is changed, the computer device records the target node as a node whose topic identifier is updated.

S614. The computer device detects whether there is a to-be-processed node that has not been used as a target node in the directed network graph; and if yes, returns to step S610; or if no, performs step 615.

S615. The computer device determines whether a node whose topic identifier is updated exists in the directed network graph; if yes, uses the node whose topic identifier is updated as a to-be-processed node in the directed network graph, and returns to step S610; or if no, determines documents corresponding to nodes having the same topic identifier as belonging to the same topic, to obtain a plurality of topics obtained through clustering.

According to another aspect, an embodiment of this application further provides an object clustering system.

Figure 7:
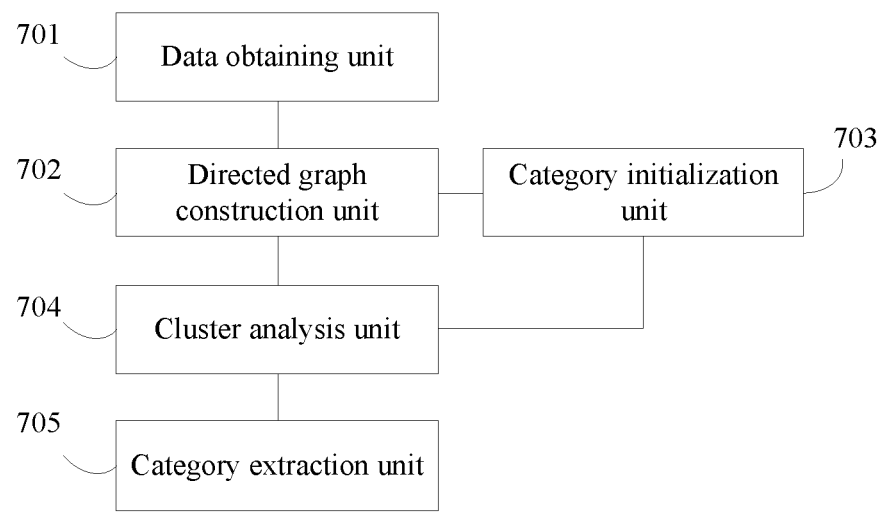
FIG. 7 is a schematic diagram of a composition structure of an embodiment of an object clustering system according to this application.

FIG. 7 is a schematic diagram of a composition structure of an embodiment of an object clustering system according to this application. The system in this embodiment may include:

a data obtaining unit 701, configured to obtain association object sets respectively associated with a plurality of to-be-clustered target objects, the association object sets each including at least one association object;

a directed graph construction unit 702, configured to: determine, for any two random target objects, a weight of a directed edge between nodes representing the two random target objects in a to-be-constructed directed network graph according to a similarity degree between an association object in an association object set of one target object and an association object in an association object set of the other target object, and construct the directed network graph;

a category initialization unit 703, configured to assign a unique category identifier to each node in the directed network graph;

a cluster analysis unit 704, configured to: sequentially use each node as a target node that needs to be processed, determine, in at least one in-degree node group corresponding to the target node, a target in-degree node group that corresponds to a largest total weight of directed edges pointing to the target node, and update the category identifier of the target node to a category identifier of an in-degree node in the target in-degree node group, until category identifiers of all nodes in the directed network graph no longer change, the in-degree node group including at least one in-degree node that has a directed edge pointing to the target node and that has the same category identifier; and a category extraction unit 705, configured to determine target objects represented by nodes having the same category identifier as belonging to one clustering category, to obtain a plurality of clustering categories corresponding to the plurality of target objects.

Optionally, the directed graph construction unit includes:

a first weight determining unit, configured to: for a random first target object and second target object in the plurality of target objects, determine, in the to-be-constructed directed network graph according to a total quantity of association objects associated with both the first target object and the second target object and a first quantity of association objects associated with the first target object, a weight of a directed edge pointing from a second node representing the second target object to a first node representing the first target object; and a second weight determining unit, configured to determine, according to the total quantity and a second quantity of association objects associated with the second target object, a weight of a directed edge pointing from the first node to the second node; and a directed graph construction subunit, configured to construct the directed network graph.

Optionally, the first weight determining unit is configured to determine a ratio of the total quantity of association objects associated with both the first target object and the second target object to the first quantity of association objects associated with the first object, as the weight of the directed edge pointing from the second node representing the second target object to the first node representing the first target object; and the second weight determining unit is configured to determine a ratio of the total quantity to the second quantity of association objects associated with the second object, as the weight of the directed edge pointing from the first node to the second node.

Optionally, the data obtaining unit is configured to obtain at least one data relationship respectively corresponding to the plurality of to-be-clustered target objects, where the data relationship includes identifiers of the target objects and a correspondence between association objects associated with the target objects.

Optionally, the category initialization unit includes:

a category initialization subunit, configured to use an identifier of a target object represented by a node in the directed network graph as a category identifier of the node.

Optionally, the cluster analysis unit includes:

a node initial processing unit, configured to use all nodes in the directed network graph as to-be-processed nodes;

a cluster analysis subunit, configured to: if there are to-be-processed nodes that have not been processed, select, from the to-be-processed nodes that have not been processed, the target node that needs to be processed, determine, in the at least one in-degree node group corresponding to the target node, the target in-degree node group that corresponds to the largest total weight of directed edges pointing to the target node, and update the category identifier of the target node to the category identifier of the in-degree node in the target in-degree node group, until all the to-be-processed nodes that have not been processed are processed as target nodes;

a loop control unit, configured to: if a node having different category identifiers before and after the update, determine the node having different category identifiers before and after the update as a to-be-processed node, and trigger returning to performing the operation performed by the cluster analysis subunit; and the category extraction unit is specifically configured to: if there is no node having different category identifiers before and after the update, determine target objects represented by nodes having the same category identifier as belonging to one clustering category, to obtain a plurality of clustering categories corresponding to the plurality of target objects.

Optionally, the target objects are user equipments, and the association objects are user identifiers. The data obtaining unit is configured to obtain sets of user identifiers respectively associated with a plurality of to-be-clustered user equipments, where the sets of user identifiers each include a plurality of user identifiers, the user identifiers associated with the user equipments are identifiers of users access a preset network by using the user equipments.

An embodiment of this application further provides a computer device. The computer device may include any one of the foregoing object clustering systemes. For a composition structure of the computer device, refer to FIG. 1. In the computer device in this embodiment of this application, the memory stores program code, and the processor executes instructions in the program code, to perform the following steps:

obtaining association object sets respectively associated with a plurality of to-be-clustered target objects, the association object sets each including at least one association object;

determining, for any two random target objects, a weight of a directed edge between nodes representing the two random target objects in a to-be-constructed directed network graph according to a similarity degree between an association object in an association object set of one target object and an association object in an association object set of the other target object, and constructing the directed network graph;

assigning a unique category identifier to each node in the directed network graph;

sequentially using each node as a target node that needs to be processed, determining, in at least one in-degree node group corresponding to the target node, a target in-degree node group that corresponds to a largest total weight of directed edges pointing to the target node, and updating the category identifier of the target node to a category identifier of an in-degree node in the target in-degree node group, until category identifiers of all nodes in the directed network graph no longer change, the in-degree node group including at least one in-degree node that has a directed edge pointing to the target node and that has the same category identifier; and determining target objects represented by nodes having the same category identifier as belonging to one clustering category, to obtain a plurality of clustering categories corresponding to the plurality of target objects.

Optionally, the processor executes the instructions in the program code, to perform the following steps:

for a random first target object and second target object in the plurality of target objects, determining, in the to-be-constructed directed network graph according to a total quantity of association objects associated with both the first target object and the second target object and a first quantity of association objects associated with the first target object, a weight of a directed edge pointing from a second node representing the second target object to a first node representing the first target object;

determining, according to the total quantity and a second quantity of association objects associated with the second target object, a weight of a directed edge pointing from the first node to the second node; and constructing the directed network graph.

Optionally, the processor executes the instructions in the program code, to perform the following steps:

determining a ratio of the total quantity of association objects associated with both the first target object and the second target object to the first quantity of association objects associated with the first object, as the weight of the directed edge pointing from the second node representing the second target object to the first node representing the first target object; and determining a ratio of the total quantity to the second quantity of association objects associated with the second object, as the weight of the directed edge pointing from the first node to the second node.

Optionally, the processor executes the instructions in the program code, to perform the following step:

obtaining at least one data relationship respectively corresponding to the plurality of to-be-clustered target objects, where the data relationship includes identifiers of the target objects and a correspondence between association objects associated with the target objects.

Optionally, the processor executes the instructions in the program code, to perform the following step:

using an identifier of a target object represented by a node in the directed network graph as a category identifier of the node.

Optionally, the processor executes the instructions in the program code, to perform the following steps:

using all nodes in the directed network graph as to-be-processed nodes;

if there are to-be-processed nodes that have not been processed, selecting, from the to-be-processed nodes that have not been processed, the target node that currently needs to be processed, determining, in the at least one in-degree node group corresponding to the target node, the target in-degree node group that corresponds to the largest total weight of directed edges pointing to the target node, and updating the category identifier of the target node to the category identifier of the in-degree node in the target in-degree node group, until all the to-be-processed nodes that have not been processed are processed as target nodes;

if a node having different category identifiers before and after the update, determining the node having different category identifiers before and after the update as a to-beprocessed node, and triggering returning to performing the operation performed by a cluster analysis subunit; and if there is no node having different category identifiers before and after the update, determining target objects represented by nodes having the same category identifier as belonging to one clustering category, to obtain a plurality of clustering categories corresponding to the plurality of target objects.

Optionally, the target objects are user equipments, the association objects are user identifiers, and the processor executes the instructions in the program code, to perform the following step:

obtaining sets of user identifiers respectively associated with a plurality of to-be-clustered user equipments, where the user identifiers are identifiers of users accessing a preset network by using the user equipments.

An embodiment of this application further provides a storage medium, configured to store program code, the program code being used to perform the object clustering method according to any one of FIG. 1 to FIG. 6.

An embodiment of this application further provides a computer program product including instructions, the computer program product, when run on a computer, causing the computer to perform the object clustering method according to any one of FIG. 1 to FIG. 6.

The system and methods described herein may be implemented in many ways. All or some of the processes of the methods in the embodiments may be implemented by a computer program instructing relevant hardware. The instructions may be stored in a computer readable storage medium. For example, in the embodiments of the present disclosure, the instructions may be stored in a storage medium of a computer system, and executed by at least one processor in the computer system, to implement the processes of the embodiments of the foregoing methods. The foregoing storage medium may be a magnetic disk, an optical disc, a read-only memory (ROM), or a random access memory (RAM). Alternatively or in addition, the units, subunits, controllers, and/or logic described herein may be referred to as a logical component(s). Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An method comprising:

obtaining a plurality of association objects respectively associated with target objects;

selecting, at random, at least two of the target objects;

determining, for the selected target objects, a weight indicative of a similarity degree between a first association object corresponding to a first one of the selected target objects and a second association object corresponding to a second one of the selected target objects;

generating a directed network graph, the directed network graph comprising nodes and directed edges associating the nodes, at least two of the nodes corresponding to the selected target objects, at least one of the edges weighted based on the weight;

assigning category identifiers the nodes of the directed network graph, wherein each node is initially assigned a unique categorical identifier;

repeatedly reassigning the categorical identifiers of the nodes, wherein repeatedly reassigning the categorical identifiers of the nodes comprises:

selecting a target node from the nodes of the directed network graph;

identifying in-degree nodes of the directed network graph, the in-degree nodes associated with corresponding directed edges, the corresponding directed edges pointed toward the target node;

grouping the in-degree nodes into in-degree node groups based on matching category identifiers, determining, from the plurality of in-degree node groups, a target in-degree node group that has a largest total weight of the corresponding directed edges pointing to the target node, and assigning a category identifier of the target in-degree node group to the category identifier of the target node; and clustering target objects based on the categorical identifiers of the nodes of the directed network graph to generate a plurality of groups of clustered targeted objects; and generate a plurality of clustering categories corresponding each of the clustered groups of target objects.

2. The method of claim 1, wherein the determining, for the selected target objects, the weight indicative of a similarity degree between the first association object corresponding to the first one of the selected target objects and the second association object corresponding to the second one of the selected target objects further comprises:

determining, based on a total quantity of association objects associated with both the first selected target object and the second selected target object, and based on a first quantity of association objects associated with the first selected target object, a first weight for a first directed edge pointing from a second node representing the second selected target object to a first node representing the first selected target object; and determining, based on the total quantity and a second quantity of association objects associated with the second selected target object, a second weight for a second directed edge pointing from the first node to the second node.

3. The method of claim 2, wherein determining, based on the total quantity of association objects associated with both the first selected target object and the second selected target object, and based on the first quantity of association objects associated with the first selected target object, the first weight for the first directed edge, further comprises:

determining a first ratio of the total quantity of association objects associated with both the first selected target object and the second selected target object to the first quantity of association objects associated with the first selected target object, the first weight comprising the first ratio, wherein determining, based on the total quantity and a second quantity of association objects associated with the second selected target object, the second weight of a directed edge pointing from the first node to the second node further comprises:

determining a second ratio of the total quantity to the second quantity of association objects associated with the second selected target object, wherein the second weight comprises the second ratio.

4. The method of claim 1, wherein obtaining the plurality of association objects respectively associated with the target objects further comprises:

obtaining a data relationship between an identifier of at least one of the target objects and an identifier of at least one of the association objects.

5. The method of claim 1, wherein assigning category identifiers the nodes of the directed network graph further comprises:

assigning identifiers of the selected target objects to the nodes, respectively, in the directed network graph.

6. The method of claim 1, wherein repeatedly reassigning the categorical identifiers further comprises:

selecting the target node in response to the target node being flagged as to-be-processed, determining, after re-assigning the category identifier of the target node, that the category identifier of the target node is different from the category identifier of the target in-degree node group; and flagging the target node as to be processed in response to determination that the category identifier of the target node is different from the category identifier of the target in-degree node group.

7. The method of claim 1, wherein repeatedly reassigning the categorical identifiers of the nodes further comprises:

selecting the target node in response to the target node being flagged as to-be-processed;

determining, after re-assigning the category identifier of the target node, the category identifier of the target node is the same as the category identifier of the target in-degree node group; and unflagging the target node as to-be-processed in response to determination that the category identifier of the target node is the same as from the category identifier of the target in-degree node group.

8. The method of claim 7, further comprising
determining that all of the nodes are unflagged as to-be processed; and in response to determination that all of the nodes are unflagged as to-be-processed:

clustering the target objects based on the categorical identifiers of the nodes of the directed network graph to generate the plurality of groups of clustered targeted objects; and determining the plurality of clustering categories corresponding each of the clustered groups of target objects.

9. The method of claim 1, wherein the target objects comprise pieces of equipment of a predetermined network and the association objects comprise user identifiers, wherein access to the pieces of equipment is governed by the predetermined network based on the user identifiers.

10. The method of claim 1, wherein the target objects comprise documents, the association objects comprise community identifiers, and the categorical identifiers correspond to topics, wherein obtaining the plurality of association objects respectively associated with target objects further comprises:

obtaining community identifier sets respectively associated with a plurality of documents, and wherein determining the plurality of clustering categories corresponding each of the clustered groups of target objects further comprise determining a plurality of topic corresponding to clustered groups of documents.

11. A system comprising:

a processor and a non-transitory computer readable storage medium, the non-transitory computer readable storage medium comprising instructions executable by the processor, wherein the instructions cause the processor to:

obtain a plurality of association objects respectively associated with target objects;

select, at random, at least two of the target objects;

determine, for the selected target objects, a weight indicative of a similarity degree between a first association object corresponding to a first one of the selected target objects and a second association object corresponding to a second one of the selected target objects;

construct a directed network graph, the directed network graph comprising nodes and a directed edges associating the nodes, at least two of the nodes corresponding to the selected target objects, at least one of the directed edges being weighted based on the weight;

assign category identifiers the nodes of the directed network graph, wherein each node is initially assigned a unique categorical identifier;

repeatedly reassign the categorical identifiers of the nodes, wherein the instructions to repeatedly reassign the categorical identifiers of the nodes further cause the processor to:
    select a target node from the nodes of the directed network graph;
    determine a plurality of in-degree node groups, wherein each of the in-degree node groups respectively include at least one in-degree node pointed to the target node, where each in-degree node of the in-degree node group are associated with matching category identifier,
    determine, from the plurality of in-degree node groups, a target in-degree node group that has a largest total weight of directed edges pointing to the target node, and assign a category identifier of the target in-degree node group to the category identifier of the target node; and
cluster target objects based on the categorical identifiers of the nodes of the directed network graph to generate a plurality of groups of clustered targeted objects; and
generate a plurality of clustering categories corresponding each of the clustered groups of target objects.

12. The system of claim 11, wherein the instructions that cause the processor to:
    determine, for the selected target objects, the weight indicative of a similarity degree between the first association object corresponding to the first one of the selected target objects and the second association object corresponding to the second one of the selected target objects further cause the processor to:
    determine, based on a total quantity of association objects associated with both the first selected target object and the second selected target object, and based on a first quantity of association objects associated with the first selected target object, a first weight for a first directed edge pointing from a second node representing the second selected target object to a first node representing the first selected target object; and
    determine, based on the total quantity and a second quantity of association objects associated with the second selected target object, a second weight for a second directed edge pointing from the first node to the second node.

13. The system of claim 12, wherein the instructions that cause the processor to determine, based on the total quantity of association objects associated with both the first selected target object and the second selected target object, and based on the first quantity of association objects associated with the first selected target object, the first weight for the first directed edge, further comprise instructions that cause the processor to:
    determine a first ratio of the total quantity of association objects associated with both the first selected target object and the second selected target object to the first quantity of association objects associated with the first selected target object, the first weight comprising the first ratio,
wherein the instructions that cause the processor to determine, based on the total quantity and a second quantity of association objects associated with the second selected target object, the second weight of a directed edge pointing from the first node to the second node further cause the processor to:
    determine a second ratio of the total quantity to the second quantity of association objects associated with the second selected target object, wherein the second weight comprises the second ratio.

14. The system of claim 12, wherein the instructions that cause the processor to repeatedly reassign the categorical identifiers further cause the processor to:
    select the target node in response to the target node being flagged as to-be-processed,
    determine, after re-assigning the category identifier of the target node, that the category identifier of the target node is different from the category identifier of the target in-degree node group; and
    flag the target node as to be processed in response to determination that the category identifier of the target node is different from the category identifier of the target in-degree node group.

15. The system of claim 12, wherein the instructions that cause the processor to repeatedly reassign the categorical identifiers further cause the processor to:
    selecting the target node in response to the target node being flagged as to-be-processed;
    determining, after re-assigning the category identifier of the target node, the category identifier of the target node is the same as the category identifier of the target in-degree node group; and
    unflagging the target node as to-be-processed in response to determination that the category identifier of the target node is the same as from the category identifier of the target in-degree node group.

16. The system of claim 15, wherein the instructions further cause the processor to:
    determine that all of the nodes are unflagged as to-be processed, wherein in response to determination that all of the nodes are unflagged as to-be-processed:
    cluster the target objects based on the categorical identifiers of the nodes of the directed network graph to generate the plurality of groups of clustered targeted objects; and
    determine the plurality of clustering categories corresponding each of the clustered groups of target objects.

17. The system claim 12, wherein the target objects comprise pieces of equipment of a predetermined network and the association objects comprise user identifiers, wherein access to the pieces of equipment is governed by the predetermined network based on the user identifiers.

18. The system of claim 11, wherein the instructions that cause the processor to obtain the plurality of association objects respectively associated with the target objects further cause the processor to:
    obtaining a data relationship between an identifier of at least one of the target objects and an identifier of at least one of the association objects.

19. The system of claim 18, wherein the instructions that cause the processor to assign category identifiers the nodes of the directed network graph further cause the processor to:
    assigning identifiers of the selected target objects to the nodes, respectively, in the directed network graph.

20. A non-transitory computer readable storage medium, comprising:
    a plurality of instructions executable by a processor to:
    obtain a plurality of association objects respectively associated with target objects;
    select, at random, at least two of the target objects;
    determine, for the selected target objects, a weight indicative of a similarity degree between a first association object corresponding to a first one of the selected target objects and a second association object corresponding to a second one of the selected target objects;

construct a directed network graph, the directed network graph comprising nodes and a directed edge associating the nodes, at least two of the nodes corresponding to the selected target objects, the directed edge being weighted based on the weight;
assign category identifiers the nodes of the directed network graph, wherein each node is initially assigned a unique categorical identifier;
select a target node from the nodes of the directed network graph;
determine a plurality of in-degree node groups, wherein each of the in-degree node groups respectively include at least one in-degree node pointed to the target node, where each in-degree node of the in-degree node group are associated with matching category identifier;
determine, from the plurality of in-degree node groups, a target in-degree node group that has a largest total weight of directed edges pointing to the target node;
assign a category identifier of the target in-degree node group to the category identifier of the target node;
cluster target objects based on the categorical identifiers of the nodes of the directed network graph to generate a plurality of groups of clustered targeted objects; and
generate a plurality of clustering categories corresponding each of the clustered groups of target objects.

* * * * *